United States Patent
Turkuz et al.

(10) Patent No.: US 12,110,252 B2
(45) Date of Patent: Oct. 8, 2024

(54) LOW-E COATED ARCHITECTURAL GLASS HAVING HIGH SELECTIVITY

(71) Applicant: TURKIYE SISE VE CAM FABRIKALARI ANONIM SIRKETI, Tuzla/Istanbul (AR)

(72) Inventors: Seniz Turkuz, Tuzla/Istanbul (AR); Ocal Tuna, Tuzla/Istanbul (AR); Alperen Sezgin, Tuzla/Istanbul (AR); Sinem Eraslan, Tuzla/Istanbul (AR); Erdem Arpat, Tuzla/Istanbul (AR); Tuncay Turutoglu, Tuzla/Istanbul (AR)

(73) Assignee: TURKIYE SISE VE CAM FABRIKALARI ANONIM SIRKETI, Istanbul (TR)

( * ) Notice: Subject to any disclaimer, the term of this patent is extended or adjusted under 35 U.S.C. 154(b) by 678 days.

(21) Appl. No.: 17/414,218

(22) PCT Filed: Dec. 12, 2019

(86) PCT No.: PCT/TR2019/051066
§ 371 (c)(1),
(2) Date: Jun. 15, 2021

(87) PCT Pub. No.: WO2020/130980
PCT Pub. Date: Jun. 25, 2020

(65) Prior Publication Data
US 2022/0041496 A1 Feb. 10, 2022

(30) Foreign Application Priority Data
Dec. 18, 2018 (TR) .................................. 2018/19743

(51) Int. Cl.
C03C 17/36 (2006.01)

(52) U.S. Cl.
CPC ........ *C03C 17/366* (2013.01); *C03C 17/3644* (2013.01); *C03C 2217/21* (2013.01);
(Continued)

(58) Field of Classification Search
CPC . C03C 17/36; C03C 17/3639; C03C 17/3644; C03C 17/366; C03C 2217/21;
(Continued)

(56) References Cited

U.S. PATENT DOCUMENTS

| | | | |
|---|---|---|---|
| 2015/0004369 A1* | 1/2015 | Eby ........................ | C03C 17/36 156/99 |
| 2015/0140354 A1* | 5/2015 | Pallotta ............... | C03C 17/3639 428/428 |
| 2022/0017409 A1* | 1/2022 | Turkuz .................... | C03C 17/36 |

FOREIGN PATENT DOCUMENTS

| | | | | |
|---|---|---|---|---|
| CN | 107117832 A | * | 9/2017 | .......... C03B 27/012 |
| CN | 207016673 U | | 2/2018 | |
| TR | 201722929 A2 | | 2/2018 | |

OTHER PUBLICATIONS

International Search Report and Written Opinion of the International Searching Authority for International Patent Application No. PCT/TR2019/051066 mailed Jan. 25, 2021, 9 pages.

\* cited by examiner

*Primary Examiner* — Kevin C T Li
(74) *Attorney, Agent, or Firm* — Bayramoglu Law Offices LLC

(57) ABSTRACT

The presently claimed invention relates to a low-e coating (20) applied onto a glass (10), in order to provide neutrality at first sight from inside and outside of automotive and architectural glasses.

6 Claims, 1 Drawing Sheet

(52) U.S. Cl.
CPC .. *C03C 2217/256* (2013.01); *C03C 2217/268* (2013.01); *C03C 2217/281* (2013.01)

(58) Field of Classification Search
CPC ........ C03C 2217/256; C03C 2217/268; C03C 2217/281
See application file for complete search history.

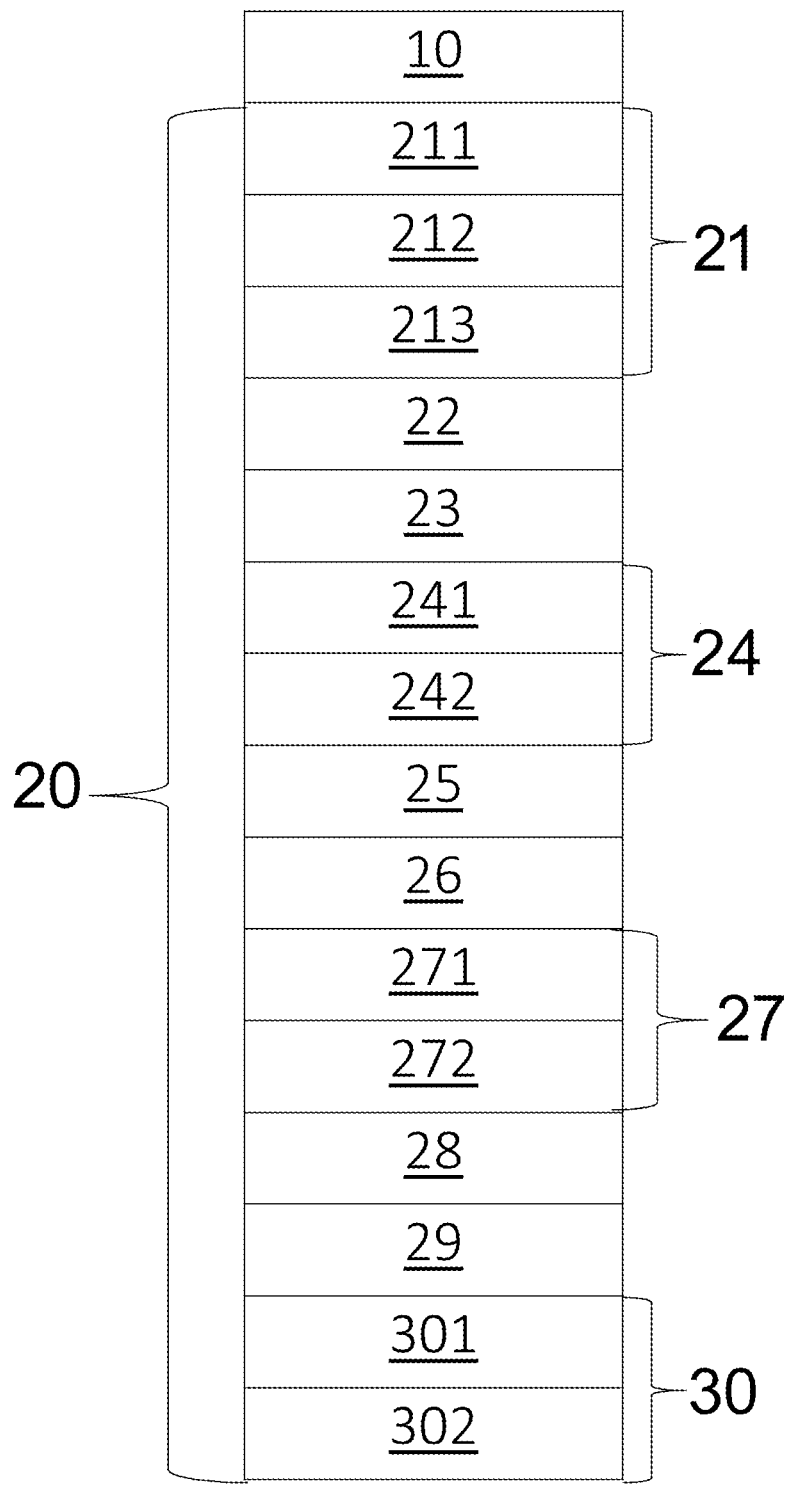

LOW-E COATED ARCHITECTURAL GLASS HAVING HIGH SELECTIVITY

CROSS-REFERENCE TO RELATED APPLICATIONS

This application is a National Stage Application of PCT/TR2019/051066, filed 12 Dec. 2019, which claims the benefit of Serial No. 2018/19743, filed 18 Dec. 2018 in Turkey, and each of which applications are incorporated herein by reference. To the extent appropriate, a claim of priority is made to each of the above-disclosed applications.

TECHNICAL FIELD

The present invention relates to a low-emission (low-e) coating which transmits daylight and used as thermal insulation glass and with high thermal process resistance and having infrared reflective layers therein.

PRIOR ART

One of the factors which differentiate optical characteristics of glasses is the coating application realized on glass surface. Magnetron sputtering process is a well-known coating application which takes place in vacuum environment. This process is a frequently applied methodology in production of low-e coated glasses, used in architectural and automotive industries. By means of said method, the transmittance and reflectance values of the coated glasses in the visible, near infrared and infrared region can be obtained at target levels.

Total solar energy transmittance (g) is also an important parameter in coated glasses which can be used in architectural and automotive sectors beside the visible region transmittance and reflectance. For lowering heating loads inside vehicles in cold climates and thus for providing fuel efficiency, high total solar transmittance (g) are preferred. The total solar energy transmittance (g) of the coatings can be kept at targeted levels by means of parametric optimizations of layers, the seed layer type used and the number of Ag layers included.

The patent with publication number US2015004369 particularly relates to a low-e coating having low solar transmittance. The coating comprises three infrared reflection film regions where each one comprises silver. In some cases, the coating is also used as a laminated glass. In the subject matter coating, the total thickness of the layers comprising silver is at most 300 A°. The third infrared layer comprising silver is thinner than the second infrared layer. The thickness of the first infrared layer comprising silver is lower than the thickness of the third infrared layer.

BRIEF DESCRIPTION OF THE INVENTION

The present invention relates to a low-e coated glass, for eliminating the above mentioned disadvantages and for bringing new advantages to the related technical field.

An object of the present invention is to provide a low-e coating which provides neutral appearance in both of the glass side and coating side when viewed from the glass side and coating side.

Another object of the present invention is to provide a low-e coating where the glass side reflection a* value stays in the negative region in all view angles.

Another object of the present invention is to provide a low-e coating which is resistant to thermal process.

In order to realize the abovementioned objects and the objects which are to be deducted from the detailed description below, the present invention is a low-e coating applied onto a glass, in order to provide neutral appearance when viewed from inside and from outside in automotive and architectural glasses. Accordingly, said coated colorless glass is characterized in that the visible region transmittance after thermal process is between 60-75% and the solar transmittance is between 23-35%, and the following is provided outwardly from the glass:

a first dielectric structure comprising at least one of $Si_xN_y$, $SiAlN_x$, $SiAlO_xN_y$, $SiO_xN_y$, $ZnSnO_x$, $TiO_x$, $TiN_x$, $ZrN_x$, NiCr, $NiCrO_x$, $TiO_x$, $ZnSnO_x$, $ZnAlO_x$, $ZnO_x$;

the first functional layer positioned on said first dielectric structure;

a first barrier layer comprising at least one of NiCr, $NiCrO_x$, $TiO_x$, $ZnAlO_x$ and positioned on said first functional layer;

the second dielectric structure comprising at least one of $Si_xN_y$, $SiAlN_x$, $SiAlO_xN_y$, $SiO_xN_y$, $ZnSnO_x$, $TiO_x$, $TiN_x$, $ZrN_x$, NiCr, $NiCrO_x$, $TiO_x$, $ZnSnO_x$, $ZnAlO_x$, $ZnO_x$ and positioned on said first barrier layer;

the second functional layer positioned on said second dielectric structure;

the second barrier layer comprising at least one of NiCr, $NiCrO_x$, $TiO_x$, $ZnAlO_x$ and positioned on said second functional layer;

the third dielectric structure comprising at least one of $Si_xN_y$, $SiAlN_x$, $SiAlO_xN_y$, $SiO_xN_y$, $ZnSnO_x$, $TiO_x$, $TiN_x$, $ZrN_x$, NiCr, $NiCrO_x$, $TiO_x$, $ZnSnO_x$, $ZnAlO_x$, $ZnO_x$ and positioned on said second barrier layer;

the third functional layer positioned on said third dielectric structure;

the third barrier layer comprising at least one of NiCr, $NiCrO_x$, $TiO_x$, $ZnAlO_x$ and positioned on said third functional layer;

the upper dielectric structure comprising at least one of or a number of layers of $Si_xN_y$, $SiAlN_x$, $SiAlO_xN_y$, $SiO_x$, $SiO_xN_y$, $ZnSnO_x$, $ZnAlO_x$, $TiO_x$, $TiN_x$, $ZrN_x$ and positioned on said third barrier layer.

In a preferred embodiment of the present invention, the first dielectric structure comprises a first dielectric layer comprising at least one of $Si_xN_y$, $SiAlN_x$, $SiAlO_xN_y$, $SiO_xN_y$, $ZnSnO_x$, $TiO_x$, $TiN_x$, $ZrN_x$ and which contacts with glass.

In another preferred embodiment of the present invention, the first dielectric structure comprises a second dielectric layer comprising at least one of $Si_xN_y$, $SiAlN_x$, $SiAlO_xN_y$, $SiO_xN_y$, $ZnSnO_x$, $TiO_x$, $TiN_x$, $ZrN_x$.

In another preferred embodiment of the present invention, at least one of the first dielectric structure, the second dielectric structure and the third dielectric structure comprises a seed layer comprising at least one of NiCr, $NiCrO_x$, $TiO_x$, $ZnSnO_x$, $ZnAlO_x$, $ZnO_x$.

In a preferred embodiment of the present invention, said seed layer contacts at least one of the first functional layer, the second functional layer and the third functional layer.

In another preferred embodiment of the present invention, pluralities of seed layers are provided, and they contact each of the first functional layer, the second functional layer and the third functional layer.

In another preferred embodiment of the present invention, each of the seed layers which contact the first functional layer, the second functional layer and the third functional layer comprises the same materials.

In a preferred embodiment of the present invention, each of the first barrier layer, the second barrier layer and the third barrier layer is in oxide form and is made of the same material.

In another preferred embodiment of the present invention, the second dielectric structure, the third dielectric structure and the upper dielectric structure comprise at least one dielectric layer in oxide form.

In another preferred embodiment of the present invention, the upper dielectric structure comprises at least two dielectric layers in oxide form.

In a preferred embodiment of the present invention, the following is provided outwardly from the glass:
the thickness of the first dielectric layer is between 15 nm and 50 nm;
the thickness of the second dielectric layer is between 1.3 nm and 4.5 nm;
the thickness of the first seed layer is between 10 nm and 30 nm;
the thickness of the first functional layer is between 5 nm and 22 nm;
the thickness of the first barrier layer is between 0.8 nm and 2.8 nm;
the thickness of the third dielectric layer is between 40 nm and 70 nm;
the thickness of the second seed layer is between 15 nm and 35 nm;
the thickness of the second functional layer is between 5 nm and 22 nm;
the thickness of the second barrier layer is between 0.8 nm and 2.8 nm;
the thickness of the fourth dielectric layer is between 35 nm and 65 nm;
the thickness of the third seed layer is between 10 nm and 35 nm;
the thickness of the third functional layer is between 5 nm and 22 nm;
the thickness of the third barrier layer is between 0.8 nm and 2.8 nm;
the thickness of the fourth dielectric layer is between 10 nm and 35 nm;
the thickness of the upper dielectric layer is between 10 nm and 35 nm.

In another preferred embodiment of the present invention, the following layers are provided outwardly from the glass: $Si_xN_y/TiO_x/ZnAlO_x/Ag/NiCrO_x/ZnSnO_x/ZnAlO_x/Ag/NiCrO_x/ZnSnO_x/ZnAlO_x/Ag/NiCrO_x/ZnSnO_x/SiO_xN_y$.

In another preferred embodiment of the present invention, the glass side reflection a* value among the color values of the low-e coated glass after thermal process is between −3.8 and −2.2 and the coating side reflection a* value is between 1.5 and 2.8.

In another preferred embodiment of the present invention, the glass side reflection b* value among the color values of the low-e coated glass after thermal process is between −5.0 and −3.5 and the transmittance b* value is between 0.8 and 2.3.

In another preferred embodiment of the present invention, the glass side reflection a* value of the low-e coated glass stays in the negative region at all sight angles.

BRIEF DESCRIPTION OF THE FIGURES

FIG. 1 is a representative view of the low-e coated glass.

REFERENCE NUMBERS

10 Glass
20 Low-e coating
21 First dielectric structure
211 First dielectric layer
212 Second dielectric layer
213 First seed layer
22 First functional layer
23 First barrier layer
24 Second dielectric structure
241 Third dielectric layer
242 Second seed layer
25 Second functional layer
26 Second barrier layer
27 Third dielectric structure
271 Fourth dielectric layer
272 Third seed layer
28 Third functional layer
29 Third barrier layer
30 Upper dielectric structure
301 Fifth dielectric layer
302 Upper dielectric layer

DETAILED DESCRIPTION OF THE INVENTION

In this detailed description, the subject matter low-e coated (20) glass (10) is explained with references to examples without forming any restrictive effect only in order to make the subject more understandable.

Production of low-e coated (20) glasses (10) related to architectural and automotive sector is realized by means of sputtering method. The present invention essentially relates to low-e coated (20) glasses (10) with three silvers and with high thermal process resistance and which can be laminated and heated and used as thermal insulation glass (10) and which transmits daylight, the ingredient of said low-e coating (20) and the application thereof.

In the present invention, a low-e coating (20) has been developed which is formed by pluralities of metal, metal oxide and metal nitride/oxy-nitride layers positioned on glass (10) surface by using sputtering method for obtaining a low-e coated (20) glass (10) designed such that the angular color change thereof is at acceptable level and which can be laminated and which can be thermally processed and which has high level of visible light transmittance in order to be applied onto the surface of glass (10). Said layers are accummulated on each other respectively in vacuum medium. As the thermal process, at least one and/or a number of tempering, partial tempering, annealing and bending processes can be used together. The subject matter low-e coated (20) glass (10) can be used as architecture and automotive glass (10).

As a result of experimental studies for developing a low-e coating (20) arrangement which is preferred in terms of production easiness and in terms of optical characteristics, the following data has been detected.

In the subject matter low-e coated (20) glass (10), the refraction indexes of all layers have been determined by using calculated methods through optical constants obtained from single-layer measurements. Said refraction indexes are the refraction index data at 550 nm.

In the subject matter low-e coating (20), there is a first functional layer (22), a second functional layer (25) and a third functional layer (28) which transmit the visible region at the targeted level and which provides reflection (lower transmission) of thermal radiation in the infrared spectrum. The first functional layer (22), the second functional layer (25) and the third functional layer (28) comprise Ag and their thermal radiation is low. In order to reach the targeted performance value, the thickness of the first functional layer (22), the second functional layer (25) and the third functional layer (28) is substantially important. In the preferred application, the thickness of the first functional layer (22), the second functional layer (25) and the third functional layer (28), comprising Ag, is between 5 nm and 22 nm. In a further preferred application, the thickness of the first functional layer (22), the second functional layer (25) and the third functional layer (28), comprising Ag, is between 8 nm and 19 nm. In the most preferred application, the thickness of the first functional layer (22), the second functional layer (25) and the third functional layer (28), comprising Ag, is between 11 nm and 17 nm. In the preferred application, the third functional layer (28) is thicker than the first functional layer (22) and the second functional layer (25). The proportion of the first functional layer (22) to the second functional layer (25) is between 0.9 and 1.1.

In the subject matter coating, there is a first dielectric structure (21) positioned between the glass (10) and the first functional layer (22) in a manner contacting thereto. Said first dielectric structure (21) comprises at least one dielectric layer and at least one seed layer. Preferably the first dielectric structure (21) comprises a first dielectric layer (211) and a second dielectric layer (212) and a first seed layer (213). Said first dielectric layer (211) and said second dielectric layer (212) comprise at least one of or more of the layers $Si_xN_y$, $SiAlN_x$, $SiAlO_xN_y$, $SiO_xN_y$, $ZnSnO_x$, $TiO_x$, $TiN_x$, $ZrN_x$.

In the preferred application, a layer comprising $Si_xN_y$ is used as the first dielectric layer (211). The first dielectric layer (211) comprising $Si_xN_y$ behaves like diffusion barrier and serves to prevent alkali ion migration which is facilitated at high temperature. Thus, the first dielectric layer (211) comprising $Si_xN_y$ supports the resistance of the low-e coating (20) to the thermal processes. The change interval for the refraction index of the first dielectric layer (211) comprising $Si_xN_y$ is between 2.00 and 2.10. In the preferred structure, the change interval for the refraction index of the first dielectric layer (211) comprising $Si_xN_y$ is between 2.02 and 2.07.

The thickness of the first dielectric layer (211) comprising $Si_xN_y$ is between 15 nm and 50 nm. In the preferred application, the thickness of the first dielectric layer (211) comprising $Si_xN_y$ is between 20 nm and 45 nm. In a further preferred application, the thickness of the first dielectric layer (211) comprising $Si_xN_y$ is between 25 nm and 40 nm.

At least one first seed layer (213) is positioned between the first dielectric layer (211) comprising $Si_xN_y$ and the Ag layer which is the first functional layer (22). In an application of the present invention, the first seed layer (213) directly contacts the first dielectric layer (211) which comprises $Si_xN_y$. The first seed layer (213) comprises at least one of NiCr, $NiCrO_x$, $TiO_x$, $ZnSnO_x$, $ZnAlO_x$, $ZnO_x$. In the preferred application, the first seed layer (213) comprises $ZnAlO_x$. The thickness of the first seed layer (213) is between 10 nm and 30 nm. In the preferred application, the thickness of the first seed layer (213) is between 13 nm and 25 nm. In a further preferred application, the thickness of the first seed layer (213) is between 15 nm and 21 nm.

In another application of the present invention, a second dielectric layer (212) is positioned between the first seed layer (213) and the first dielectric layer (211) comprising $Si_xN_y$. Said second dielectric layer (212) comprises at least one of $TiO_x$, $ZrO_x$, $NbO_x$ layers. In the preferred application, $TiO_x$ is used as the second dielectric layer (212). Since $TiO_x$ is a material with high refraction index, it provides obtaining of the same optical performance with less total physical thickness and plays a role of increasing $T_{vis}$% value of the low-e coating (20). The refraction index of $TiO_x$ layer is between 2.40 and 2.60. In the preferred application, the refraction index of $TiO_x$ layer is between 2.45 and 2.55. The thickness of the $TiO_x$ layer which is the second dielectric layer (212) is between 1.3 nm and 4.5 nm. In the preferred application, the thickness of the $TiO_x$ layer is between 1.6 nm and 4 nm. In a further application, the thickness of the $TiO_x$ layer is between 1.8 nm and 3.4 nm.

There is a first barrier layer (23) positioned on the first functional layer (22) comprising Ag in a manner contacting said first functional layer (22), there is a second barrier layer (26) positioned on the second functional layer (25) in a manner contacting said second functional layer (25), and there is a third barrier layer (29) positioned on the third functional layer (28) in a manner contacting said third functional layer (28). The first barrier layer (23), the second barrier layer (26) and the third barrier layer (29) comprises at least one of NiCr, $NiCrO_x$, $TiO_x$, $ZnAlO_x$ materials. In the preferred application, $NiCrO_x$ is used as the first barrier layer (23), the second barrier layer (26) and the third barrier layer (29). The thicknesses of the first barrier layer (23), the second barrier layer (26) and the third barrier layer (29) comprising $NiCrO_x$ is between 0.8 nm and 2.8 nm. In the preferred application, the thicknesses of the first barrier layer (23), the second barrier layer (26) and the third barrier layer (29) comprising $NiCrO_x$ is between 1.0 nm and 2.5 nm. In a further preferred application, the thicknesses of the first barrier layer (23), the second barrier layer (26) and the third barrier layer (29) comprising $NiCrO_x$ is between is between 1.5 nm and 2.2 nm. In an application of the present invention, the thicknesses of the second barrier layer (26) and the third barrier layer (29) are equal to each other.

The second dielectric structure (24) is positioned between the first functional layer (22) and the second functional layer (25), and the third dielectric structure (27) is positioned between the second functional layer (25) and the third functional layer (28). Each of the second dielectric structure (24) and the third dielectric structure (27) comprises at least one dielectric layer comprising at least one of $Si_xN_y$, $SiAlN_x$, $SiAlO_xN_y$, $SiO_xN_y$, $ZnSnO_x$, $TiO_x$, $TiN_x$, $ZrN_x$ layers, and at least one seed layer comprising at least one of NiCr, $NiCrO_x$, $TiO_x$, $ZnSnO_x$, $ZnAlO_x$, $ZnO_x$.

The second dielectric structure (24) comprises a third dielectric layer (241) and a second seed layer (242). The third dielectric layer (241) preferably comprises $ZnSnO_x$. The thickness of the third dielectric layer (241) comprising $ZnSnO_x$ is between 40 nm and 70 nm. In the preferred application, the thickness of the third dielectric layer (241) comprising $ZnSnO_x$ is between 45 nm and 65 nm. In a further preferred application, the thickness of the third dielectric layer (241) comprising $ZnSnO_x$ is between 50 nm and 60 nm.

The second seed layer (242) preferably comprises $ZnAlO_x$. The thickness of the second seed layer (242) comprising $ZnAlO_x$ is between 15 nm and 35 nm. In the preferred application, the thickness of the second seed layer (242) comprising $ZnAlO_x$ is between 17 nm and 33 nm. In a further preferred application, the thickness of the second seed layer (242) comprising $ZnAlO_x$ is between 20 nm and 30 nm.

The third dielectric structure (27) comprises a fourth dielectric layer (271) and a third seed layer (272). The fourth dielectric layer (271) preferably comprises $ZnSnO_x$. The thickness of the fourth dielectric layer (271) comprising $ZnSnO$, is between 35 nm and 65 nm. In the preferred application, the thickness of the fourth dielectric layer (271) comprising $ZnSnO_x$ is between 40 nm and 60 nm. In a further preferred application, the thickness of the fourth dielectric layer (271) comprising ZnSnO, is between 45 nm and 57 nm.

The third seed layer (272) preferably comprises $ZnAlO_x$. The thickness of the third seed layer (272) comprising $ZnAlO_x$ is between 10 nm and 35 nm. In the preferred application, the thickness of the third seed layer (272) comprising $ZnAlO_x$ is between 15 nm and 30 nm. The thickness of the third seed layer (272) comprising $ZnAlO_x$ is between 18 nm and 25 nm.

There is an upper dielectric structure (30) on the third barrier layer (29). Said dielectric structure (30) comprises at least one dielectric layer comprising at least one or a number of $Si_xN_y$, $SiAlN_x$, $SiAlO_xN_y$, $SiO_x$, $SiO_xN_y$, $ZnSnO_x$, $ZnAlO_x$, $TiO_x$, $TiN_x$, $ZrN_x$ layers. The upper dielectric structure (30) preferably comprises a fourth dielectric layer (301); an upper dielectric layer (302) accummulated on said fourth dielectric layer (302).

The fifth dielectric layer (301) preferably comprises $ZnSnO_x$. The thickness of the fifth dielectric layer (301) comprising $ZnSnO_x$ is between 10 nm and 35 nm. In the preferred application, the thickness of the fifth dielectric layer (301) comprising $ZnSnO_x$ is between 13 nm and 30 nm. In a further preferred application, the thickness of the fifth dielectric layer (301) comprising $ZnSnO_x$ is between 15 nm and 25 nm.

The upper dielectric layer (302) preferably comprises at least one of $SiO_xN_y$ or $Si_xN_y$. The thickness of the upper dielectric layer (302) comprising $SiO_xN_y$ is between 10 nm and 35 nm.

In the preferred application, the thickness of the upper dielectric layer (302) comprising $SiO_xN_y$ is between 15 nm and 28 nm. In a further preferred application, the thickness of the upper dielectric layer (302) comprising $SiO_xN_y$ is between 17 nm and 25 nm.

The characteristics of the uppermost dielectric layer (302) of the low-e coating (20) are substantially important for the storage lifetime, thermal processability, resistance and visual aesthetics of the low-e coated (20) glass (10) since said characteristics determine the character of the coated glass (10) during thermal process.

The visible region transmittance of the subject matter low-e coated (20) glass (10) is between 60-75% and the solar transmittance thereof is between 23-35%. In the preferred application, the visible region transmittance of the low-e coated (20) glass (10) is between 63-73% and the solar transmittance thereof is between 25% and 33%. In the most preferred application, the visible region transmittance of the low-e coated (20) glass (10) after thermal process is between 65-70% and the solar transmittance thereof is between 27% and 31%.

The glass side reflection a* value among the color performance values of the low-e coated (20) glass (10), obtained by means of coating of the layers onto the glass (10) respectively in the above mentioned manner, is between −3.8 and −2.2. In the preferred application, the glass side reflection a* value is between −3.5 and −2.4. In a further preferred application, the glass side reflection a* value is between −3.2 and −2.6. The glass side reflection b* value after thermal process among the color values of the low-e coated (20) glass (10) is between −5.0 and −3.5. In the preferred application, the glass side reflection b* value among the color values is between −4.7 and −3.8. In a further preferred application, the glass side reflection b* value among the color values is between −4.5 and −4.0.

In the usage of the second surface, the glass (10) side reflection a* and b* values are important and moreover, it is important that the coating side reflection a* and transmittance b* values are close to "0" for providing total neutrality of the glass (10). By means of this, neutral appearance can be obtained when the low-e coated (20) glass (10), used in the heat glass unit, is viewed from outside and from the inside. The coating side reflection a* value of the subject matter low-e coated (20) glass (10) after thermal process is between 1.5 and 2.8. In the preferred application, the coating side reflection a* value of the subject matter low-e coated (20) glass (10) after thermal process is between 1.8 and 2.6. In the further preferred application, the coating side reflection a* value of the subject matter low-e coated (20) glass (10) after thermal process is between 2.0 and 2.4. The coating side transmittance b* value of the subject matter low-e coated (20) glass (10) after thermal process is between 0.8 and 2.3.

In the preferred application, the coating side transmittance b* value of the subject matter low-e coated (20) glass (10) after thermal process is between 1.1 and 2.0. In the further preferred application, the coating side transmittance b* value of the subject matter low-e coated (20) glass (10) after thermal process is between 1.4 and 1.8.

When the transmittance b* value and the coating side and the glass side angular and normal reflection values given above are evaluated, in the subject matter low-e coated (20) glass (10), in both sights of the coating side and the glass side, yellow and red reflection colors are not observed in the low-e coated (20) glass (10) and a neutral image is exhibited.

Coating of the layers, forming said low-e coating (20), onto the glass (10) at mentioned thicknesses, bears importance in terms of obtaining the coated glass (10) glass side angular color change and in terms of obtaining the desired optical performances. The glass side reflection a* value of the subject matter low-e coated (20) glass (10) stays in the negative region at all sight angles and the low-e coated (20) glass (10) does not show red reflection. The thickness of the fourth dielectric layer (271) comprising $ZnSnO_x$ is critical in obtaining said performance, color and angular color change. In case it is thicker than the given value ranges, the glass side reflection color value of the low-e coated (20) glass (10) is drawn towards the positive region at low angles, and in case it is thinner, the glass side reflection color value of the low-e coated (20) glass (10) is drawn towards the positive region at high angles.

While the solar energy transmittance is reflected in an active manner, at the same time, the visible region light transmittance after thermal process between 65-70% can be obtained by means of the total thicknesses of the functional layers. Because of the thickness distribution of these functional layers in its own, particularly since the third functional layer (28) is thicker than the first functional layer (22) and the second functional layer (25), the angular color change is affected. Additionally, the proportion between the above mentioned first functional layer (22) and the second functional layer (25) affects on the color values.

The protection scope of the present invention is set forth in the annexed claims and cannot be restricted to the illustrative disclosures given above, under the detailed description. It is because a person skilled in the relevant art can obviously produce similar embodiments under the light of the foregoing disclosures, without departing from the main principles of the present invention.

What is claimed is:

1. A low-e coating applied onto a glass for providing neutrality when viewed from inside and from outside in automotive and architectural glasses, comprising outwardly from the glass:
- a first dielectric structure comprising a first dielectric layer, a second dielectric layer and a first seed layer; wherein the first dielectric layer is $Si_xN_y$ and a thickness of the first dielectric layer is between 15 nm and 50 nm; the second dielectric layer is $TiO_x$ and a thickness of the second dielectric layer is between 1.3 nm and 4.5 nm; and the first seed layer is $ZnAlO_x$ and a thickness of the first seed layer is between 10 nm and 30 nm;
- a first functional layer positioned on said first dielectric structure, wherein a thickness of the first functional layer is between 5 nm and 22 nm;
- a first barrier layer comprising $NiCrO_x$ and positioned on said first functional layer, wherein a thickness of the first barrier layer is between 0.8 nm and 2.8 nm;
- a second dielectric structure positioned on said first barrier layer comprising a third dielectric layer and a second seed layer; wherein the third dielectric layer is $ZnSnO_x$ and a thickness of the third dielectric layer is between 40 nm and 70 nm; and the second seed layer is $ZnAlO_x$ and a thickness of the second seed layer is between 15 nm and 35 nm;
- a second functional layer positioned on said second dielectric structure, wherein a thickness of the second functional layer is between 5 nm and 22 nm;
- a second barrier layer comprising $NiCrO_x$ and positioned on said second functional layer, wherein a thickness of the second barrier layer is between 0.8 nm and 2.8 nm;
- a third dielectric structure positioned on said second barrier layer comprising a fourth dielectric layer and a third seed layer; wherein the fourth dielectric layer is $ZnSnO_x$ and a thickness of the fourth dielectric layer is between 35 nm and 65 nm; and the third seed layer is $ZnALO_x$ and a thickness of the third seed layer is between 10 nm and 35 nm;
- a third functional layer positioned on said third dielectric structure, wherein a thickness of the third functional layer is between 5 nm and 22 nm;
- a third barrier layer comprising $NiCrO_x$ and positioned on said third functional layer, wherein a thickness of the third barrier layer is between 0.8 nm and 2.8 nm; and
- an upper dielectric structure positioned on said third barrier layer comprising a fifth dielectric layer and an upper dielectric layer; wherein the fifth dielectric layer is $ZnSnO_x$ and a thickness of the fifth dielectric layer is between 10 nm and 35 nm; and the upper dielectric layer is $SiO_xN_y$ and a thickness of the upper dielectric layer is between 10 nm and 35 nm;
- wherein the visible region transmittance value after thermal process is between 60-75% and the solar transmittance value is between 23-35%.

2. The low-e coating according to claim 1, wherein the first dielectric layer contacts the glass.

3. The low-e coating according to claim 1, wherein the layers provided outwardly from the glass consist of: $Si_xN_y$/$TiO_x$/$ZnAlO_x$/Ag/$NiCrO_x$/$ZnSnO_x$/$ZnAlO_x$/Ag/$NiCrO_x$/$ZnSnO_x$/$ZnALO_x$/Ag/$NiCrO_x$/$ZnSnO_x$/$SiO_xN_y$, respectively.

4. The low-e coating according to claim 1, wherein a glass side reflection a* value among color values of the low-e coated glass after thermal process is between −3.8 and −2.2 and a coating side reflection a* value is between 1.5 and 2.8.

5. The low-e coating according to claim 1, wherein a glass side reflection b* value among color values of the low-e coated glass after thermal process is between −5.0 and −3.5 and a transmittance b* value is between 0.8 and 2.3.

6. The low-e coating according to claim 1, wherein a glass side reflection a* value of the low-e coated glass is less than 0 at all sight angles.

* * * * *